US012590623B1

(12) United States Patent
Zeng

(10) Patent No.: US 12,590,623 B1
(45) Date of Patent: Mar. 31, 2026

(54) LINEAR TELESCOPIC MECHANISM

(71) Applicant: Zhuo Zeng, Shenzhen (CN)

(72) Inventor: Zhuo Zeng, Shenzhen (CN)

( * ) Notice: Subject to any disclaimer, the term of this patent is extended or adjusted under 35 U.S.C. 154(b) by 0 days.

(21) Appl. No.: 19/014,284

(22) Filed: Jan. 9, 2025

(51) Int. Cl.
F16H 25/20 (2006.01)

(52) U.S. Cl.
CPC ... F16H 25/2015 (2013.01); *F16H 2025/204* (2013.01); *F16H 2025/2075* (2013.01)

(58) Field of Classification Search
CPC .......................... F16H 2025/204; F16C 29/005
USPC .............................................. 74/89.32, 89.33
See application file for complete search history.

(56) References Cited

U.S. PATENT DOCUMENTS

2011/0298323 A1* 12/2011 Brieschke .............. H02K 7/116
74/25
2024/0117591 A1* 4/2024 Gateau ...................... E02F 3/38

FOREIGN PATENT DOCUMENTS

DE 102018117052 A1 * 1/2020 ............. F16H 25/20

* cited by examiner

*Primary Examiner* — Randell J Krug
(74) *Attorney, Agent, or Firm* — Jose Cherson Weissbrot

(57) ABSTRACT
A linear telescopic mechanism includes a base, a fixing frame, a moving device and a movement detection mechanism, wherein the fixing frame is fixedly installed at the middle part of an upper surface of the base, and the moving device is fixedly installed on the upper surface of the base and at one side of the fixing frame. A storage battery to transmit power to a control motor via a controller, drives a moving rod to move through the operation of the moving device and the movement detection mechanism, blocks the signals of first infrared sensors or second infrared sensors by means of baffles.

5 Claims, 3 Drawing Sheets

LINEAR TELESCOPIC MECHANISM

TECHNICAL FIELD

The present utility model relates to the field of linear telescopic mechanisms, in particular to a novel linear telescopic mechanism.

BACKGROUND

The existing linear telescopic mechanisms include air cylinders, telescopic rods, etc., which are devices for linear motion. Some of the existing linear telescopic mechanisms are operated by using motors and chain drive or gear drive. When precision is required, the existing linear telescopic mechanism is operated by controlling the precision of the motor, but using such a motor will increase the production cost.

Therefore, it is necessary to provide a novel linear telescopic mechanism to solve the above technical problems.

SUMMARY

In order to solve the above technical problems, the present utility model provides a novel linear telescopic mechanism.

The novel linear telescopic mechanism provided by the present utility model includes a base, a fixing frame, a moving device and a movement detection mechanism, where the fixing frame is fixedly installed at the middle part of an upper surface of the base, the moving device is fixedly installed on the upper surface of the base and at one side of the fixing frame, the moving device includes a control motor, a mounting plate, a threaded rod, a guide rail, positioning grooves, a threaded block, a connecting block and positioning blocks, the control motor is fixedly installed at one side of the fixing frame by means of a bolt, the mounting plate is fixedly installed on an upper surface of one end of the base far from the control motor, the threaded rod is rotatably installed between the mounting plate and the fixing frame by means of a bearing, one end of the threaded rod close to the control motor is fixedly connected to one output end of the control motor by means of a coupling, the guide rail is fixedly installed on the upper surface of the base corresponding to a position between the fixing frame and the mounting plate, both sides of the guide rail are symmetrically provided with the positioning grooves, one outer side of the threaded rod is in threaded connection with the threaded block, the connecting block is fixedly installed at the middle part of the threaded block, the positioning blocks are fixedly installed at positions of the connecting block corresponding to the positioning grooves, the positioning blocks are slidably connected to the positioning grooves, the movement detection mechanism is fixedly installed on both sides of the upper surface of the base, and movement detection mechanism is used to detect the moving distance of the connecting block. When the device is in use, the rotation of the threaded rod is controlled through the operation of the control motor, the movement of the connecting block is controlled by the sliding of the positioning blocks inside the positioning grooves, and then the precision of the movement is controlled by means of the movement detection mechanism.

Preferably, a storage battery is fixedly installed at a position corresponding to the control motor on a lower surface of the base by means of a bolt, and the storage battery is electrically connected to the control motor. The storage battery is used to supply power to the control motor to realize the separate operation of the device, thus enlarging the application scope of the device.

Preferably, the positioning blocks are closely fitted with the positioning grooves to slide. The stability of the connecting block sliding along the positioning grooves is achieved.

Preferably, the movement detection mechanism includes baffles, grooves, first infrared sensors, second infrared sensors, a moving rod, a sliding hole and a controller, the baffles are symmetrically fixed and installed on both sides of the connecting block by means of bolts, the upper surface of the base is provided with grooves corresponding to moving tracks of the baffles, the first infrared sensors are symmetrically and fixedly installed on the upper surface of the base close to one ends of the grooves, second infrared sensors are symmetrically and fixedly installed on the upper surface of the base close to the other ends of the grooves, the first infrared sensors and the second infrared sensors are both electrically connected to the storage battery, the baffles are located between the two second infrared sensors and the two first infrared sensors, the moving rod is fixedly installed at one side of the connecting block, the mounting plate is provided with a sliding hole at a position corresponding to the moving rod, the moving rod is connected to the sliding hole in a sliding manner, and the controller is fixedly installed at the bottom of the control motor. When the control motor controls the connecting block to move, the movement of the connecting block is limited through the operation of the first infrared sensors and the second infrared sensors to achieve the precision of the moving rod.

Preferably, clamp blocks are symmetrically and fixedly installed at the bottom of the lower surface of the base. It is convenient to fix the device in one place.

Preferably, a sealing cover is fixedly installed within a space defined by the base, the fixing frame and the mounting plate by means of bolts. The internal space defined by the base, the fixing frame and the mounting plate is sealed.

Compared with the related art, the linear telescopic mechanism provided by the present utility model has the following beneficial effects:

Compared with the prior art, the novel linear telescopic mechanism provided by the present utility model controls the storage battery to transmit power to the control motor by means of the controller, drives the moving rod to move through the operation of the moving device and the movement detection mechanism, blocks the signals of the first infrared sensors or the second infrared sensors by means of the baffles and then transmits the signals of the first infrared sensors or the second infrared sensors to the controller, and cancels the power transmission from the storage battery to the control motor by means of the controller so as to control the connecting block to start or stop moving, thus improving the movement precision of the moving rod. There is no need to require the accuracy of the motor, which greatly reduces the production cost.

Figure 1:
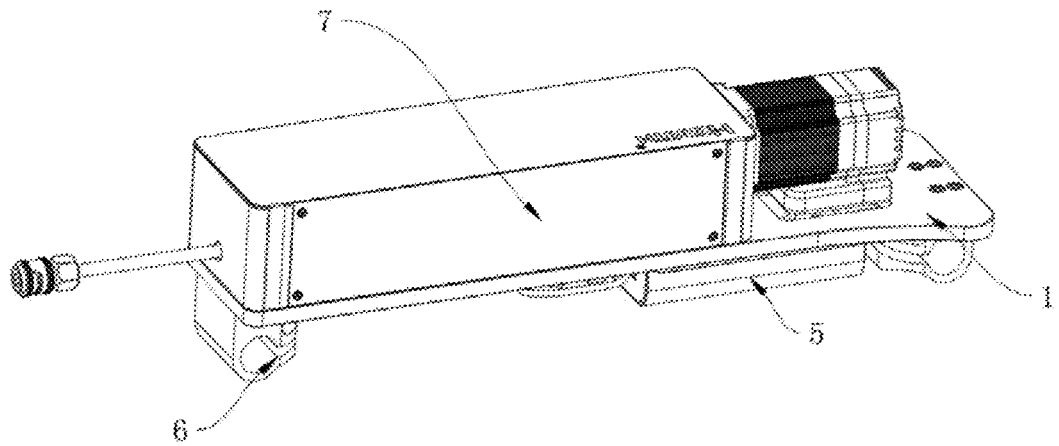
FIG. 1 is a first schematic diagram of an overall structure of an novel linear telescopic mechanism provided by the present utility model.

The reference numerals on the drawings: 1. a base; 2. a fixing frame; 3. a moving device; 4. a movement detection mechanism; 5. a storage battery; 6. clamp blocks; 7. a sealing cover; 31. a control motor; 32. a mounting plate; 33. a threaded rod; 34. a guide rail; 35. positioning grooves; 36. a threaded block; 37. a connecting block; 38. positioning blocks; 41. baffles; 42. grooves; 43. first infrared sensor; 44. second infrared sensors; 45. a moving rod; 46. a sliding hole; and 47. a controller.

DETAILED DESCRIPTION

In order to make the objectives, technical solutions, and advantages of the present utility model clearer, the present utility model is further described in detail below in conjunction with the accompanying drawings and embodiments. It is to be understood that specific embodiments described herein are only adopted to explain the present utility model and not intended to limit the present utility model.

The specific implementation of the present utility model is described in detail below in combination with the specific embodiments.

Figure 2:
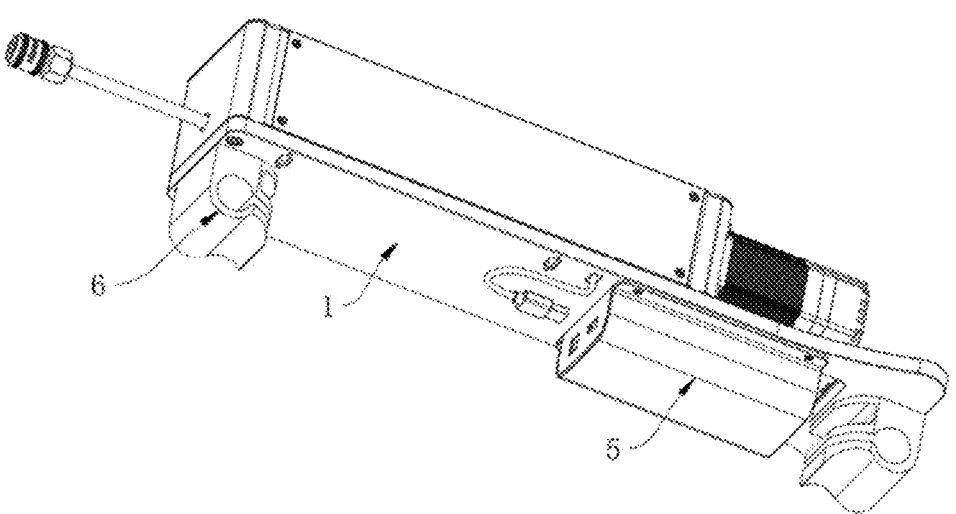
FIG. 2 is a second schematic diagram of the overall structure shown in FIG. 1.
Figure 3:
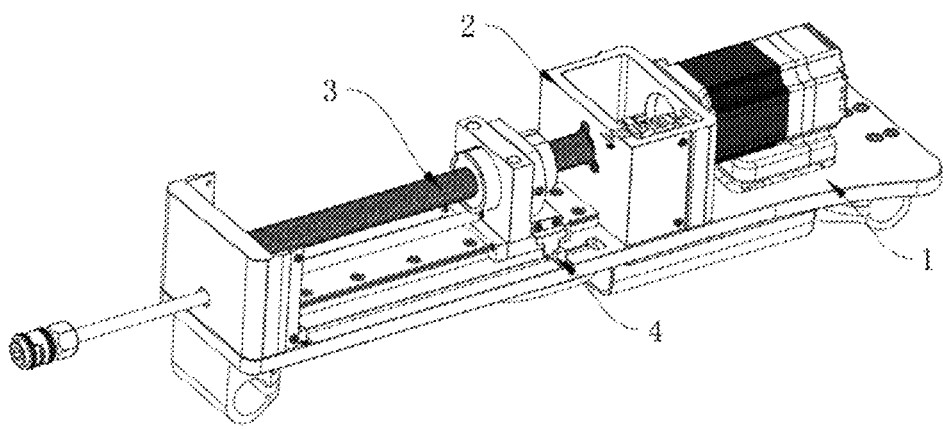
FIG. 3 is a first schematic diagram of a local structure shown in FIG. 1.
Figure 4:
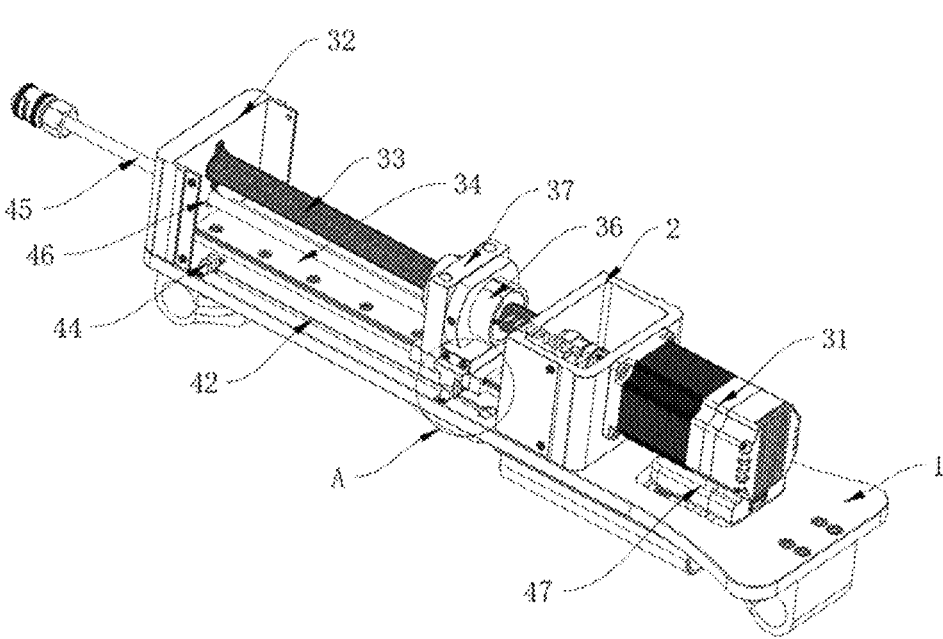
FIG. 4 is a second schematic diagram of the local structure shown in FIG. 1.
Figure 5:
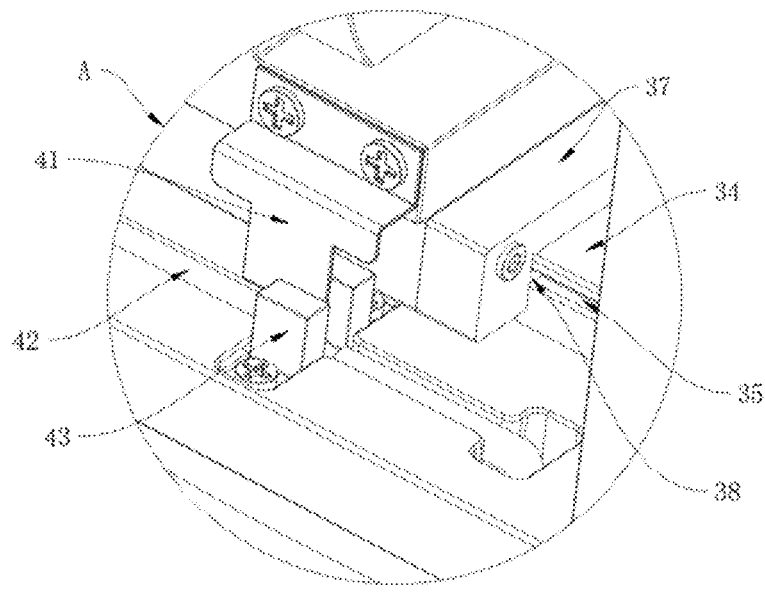
FIG. 5 is an enlarged view at A in FIG. 4.

Referring to FIG. 1 to FIG. 5, a novel linear telescopic mechanism provided by the present utility model includes a base 1, a fixing frame 2, a moving device 3 and a movement detection mechanism 4, where the fixing frame 2 is fixedly installed at the middle part of an upper surface of the base 1, the moving device 3 is fixedly installed on the upper surface of the base 1 and at one side of the fixing frame 2, the moving device 3 includes a control motor 31, a mounting plate 32, a threaded rod 33, a guide rail 34, positioning grooves 35, a threaded block 36, a connecting block 37 and positioning blocks 38, the control motor 31 is fixedly installed at one side of the fixing frame 2 by means of a bolt, the mounting plate 32 is fixedly installed on an upper surface of one end of the base 1 far from the control motor 31, the threaded rod 33 is rotatably installed between the mounting plate 32 and the fixing frame 2 by means of a bearing, one end of the threaded rod 33 close to the control motor 31 is fixedly connected to one output end of the control motor 31 by means of a coupling, the guide rail 34 is fixedly installed on the upper surface of the base 1 corresponding to a position between the fixing frame 2 and the mounting plate 32, both sides of the guide rail 34 are symmetrically provided with the positioning grooves 35, one outer side of the threaded rod 33 is in threaded connection with the threaded block 36, the connecting block 37 is fixedly installed at the middle part of the threaded block 36, the positioning blocks 38 are fixedly installed at positions of the connecting block 37 corresponding to the positioning grooves 35, the positioning blocks 38 are slidably connected to the positioning grooves 35, the movement detection mechanism 4 is fixedly installed on both sides of the upper surface of the base 1, and movement detection mechanism 4 is used to detect the moving distance of the connecting block 37.

It should be noted that when the device is in use, the rotation of the threaded rod 33 is controlled through the operation of the control motor 31, the movement of the connecting block 37 along tracks of the positioning grooves 35 is controlled through the sliding limit of the positioning blocks 38 inside the positioning grooves 35 and the threaded connection between the threaded rod 33 and the threaded block 36, and the movement precision is controlled by means of the movement detection mechanism 4.

According to the embodiments of the present utility model, referring to FIG. 1 to FIG. 5, a storage battery 5 is fixedly installed at a position corresponding to the control motor 31 on a lower surface of the base 1 by means of a bolt, and the storage battery 5 is electrically connected to the control motor 31; and it should be noted that the storage battery 5 is used to supply power to the control motor 31 to realize the separate operation of the device, thus enlarging the application scope of the device.

According to the embodiments of the present utility model, referring to FIG. 1 to FIG. 5, the positioning blocks 38 are closely fitted with the positioning grooves 35 to slide; and it should be noted that the stability of the connecting block 37 sliding along the positioning grooves 35 is achieved.

According to the embodiments of the present utility model, referring to FIG. 1 to FIG. 5, the movement detection mechanism 4 includes baffles 41, grooves 42, first infrared sensors 43, second infrared sensors 44, a moving rod 45, a sliding hole 46 and a controller 47, the baffles 41 are symmetrically fixed and installed on both sides of the connecting block 37 by means of bolts, the upper surface of the base 1 is provided with grooves 42 corresponding to moving tracks of the baffles 41, the first infrared sensors 43 are symmetrically and fixedly installed on the upper surface of the base 1 close to one ends of the grooves 42, second infrared sensors 44 are symmetrically and fixedly installed on the upper surface of the base 1 close to the other ends of the grooves 42, the first infrared sensors 43 and the second infrared sensors 44 are both electrically connected to the storage battery 5, the baffles 41 are located between the two second infrared sensors 44 and the two first infrared sensors 43, the moving rod 45 is fixedly installed at one side of the connecting block 37, the mounting plate 32 is provided with a sliding hole 46 at a position corresponding to the moving rod 45, the moving rod 45 is connected to the sliding hole 46 in a sliding manner, and the controller 47 is fixedly installed at the bottom of the control motor 31; and it should be noted that when the control motor 31 controls the connecting block 37 to move, the moving rod 45 is further driven to move, the signals of the first infrared sensors 43 or the second infrared sensors 44 are blocked by means of baffles 41 in the moving process of the connecting block 37, the signals of the first infrared sensors 43 or the second infrared sensors 44 are then transmitted to the controller 47, and the power transmission from the storage battery 5 to the control motor 31 is canceled by means of the controller 47 so as to control the connecting block 37 to start or stop moving, thus improving the movement precision of the moving rod 45.

According to the embodiments of the present utility model, referring to FIG. 1 to FIG. 5, clamp blocks 6 are symmetrically and fixedly installed at the bottom of the lower surface of the base 1; and it should be noted that it is convenient to fix the device in one place. According to the embodiments of the present utility model, referring to FIG. 1 to FIG. 5, a sealing cover 7 is fixedly installed within a space defined by the base 1, the fixing frame 2 and the mounting plate by means of bolts 32; and it should be noted that the internal space defined by the base 1, the fixing frame 2 and the mounting plate 32 is sealed.

When the device is in use, the controller 47 controls the storage battery 5 to transmit power to the control motor 31, the rotation of the threaded rod 33 is controlled through the operation of the control motor 31, the movement of the connecting block 37 along tracks of the positioning grooves 35 is controlled through the sliding limit of the positioning blocks 38 inside the positioning grooves 35 and the threaded connection between the threaded rod 33 and the threaded block 36 so as to drive the moving rod 45 to move, the signals of the first infrared sensors 43 or the second infrared sensors 44 are blocked by means of baffles 41 in the moving process of the connecting block 37, the signals of the first infrared sensors 43 or the second infrared sensors 44 are then transmitted to the controller 47, and the power transmission from the storage battery 5 to the control motor 31 is canceled by means of the controller 47 so as to control the connecting block 37 to start or stop moving, thus improving the movement precision of the moving rod 45.

The circuit and control involved in the present utility model all belong to the prior art, so we will not repeat them here.

The above is only an embodiment of the present utility model, and does not therefore limit the patent scope of the present utility model. The equivalent structures or equivalent process transformations, which are made by using the contents of the Description and Drawings of the present utility model, or directly or indirectly applied to other relevant technical fields, are similarly included in the protection scope of the present utility model.

What is claimed is:

1. A linear telescopic mechanism, comprising:
a base (1) having a first end and a second end, a fixing frame (2) being fixedly installed at a middle part of an upper surface of the base (1);
a moving device (3), the moving device (3) being fixedly installed on the upper surface of the base (1) and at one side of the fixing frame (2), and the moving device (3) comprising:
a control motor (31), the control motor (31) being fixedly installed at one side of the fixing frame (2) by means of a bolt:
a mounting plate (32) being fixedly installed on an upper surface of the first end of the base (1), a threaded rod (33) having a first end and a second end, the threaded rod (33) being rotatably installed between the mounting plate (32) and the fixing frame (2) by means of a bearing, and the first end of the threaded rod (33) is connected with the mounting plate and the second end of the threaded rod being fixedly connected to one output end of the control motor (31) by means of a coupling:
a guide rail (34), the guide rail (34) being fixedly installed on the upper surface of the base (1) corresponding to a position between the fixing frame (2) and the mounting plate (32), both sides of the guide rail (34) being symmetrically provided with positioning grooves (35), one outer side of the threaded rod (33) being in threaded connection with a threaded block (36), a connecting block (37) being fixedly installed at a middle part of the threaded block (36), positioning blocks (38) being fixedly installed at positions of the connecting block (37) corresponding to the positioning grooves (35), and the positioning blocks (38) being slidably connected to the positioning grooves (35);
a movement detection mechanism (4), the movement detection mechanism (4) being fixedly installed on both sides of the upper surface of the base (1), and the movement detection mechanism (4) being used to detect a moving distance of the connecting block (37); and
wherein a storage battery (5) is fixedly installed at a position corresponding to the control motor (31) on a lower surface of the base (1) by means of a bolt, and the storage battery (5) is electrically connected to the control motor (31).

2. The linear telescopic mechanism according to claim 1, wherein the positioning blocks (38) are fitted with the positioning grooves (35) to slide.

3. The linear telescopic mechanism according to claim 1, wherein bolts are used to fixedly install a sealing cover (7) within a space defined by the base (1), the fixing frame (2) and the mounting plate (32).

4. The linear telescopic mechanism according to claim 1, wherein the movement detection mechanism (4) comprises:
baffles (41), the baffles (41) are symmetrically fixed and installed on both sides of the connecting block (37) by means of bolts, and the upper surface of the base (1) is provided with grooves (42) corresponding to moving tracks of the baffles (41);
first infrared sensors (43) are symmetrically and fixedly installed on the upper surface of the base (1) adjacent to a first end of the grooves (42), second infrared sensors (44) are symmetrically and fixedly installed on the upper surface of the base (1) adjacent to a second end of the grooves (42), the first infrared sensors (43) and the second infrared sensors (44) are both electrically connected to the storage battery (5), and the baffles (41) are located between the two second infrared sensors (44) and the two first infrared sensors (43);
a moving rod (45), the moving rod (45) is fixedly installed at one side of the connecting block (37), the mounting plate (32) is provided with a sliding hole (46) at a position corresponding to the moving rod (45), and the moving rod (45) is connected to the sliding hole (46) in a sliding manner; and
a controller (47), the controller (47) is fixedly installed at the bottom of the control motor (31).

5. The linear telescopic mechanism according to claim 4, wherein clamp blocks (6) are symmetrically and fixedly installed at a bottom of a lower surface of the base (1).

* * * * *